United States Patent
Nylander

(10) Patent No.: US 11,601,536 B2
(45) Date of Patent: Mar. 7, 2023

(54) EUROPEAN TELECOMMUNICATIONS STANDARDS INSTITUTE (ETSI) COOPERATIVE INTELLIGENT TRANSPORT SYSTEM (C-ITS) COMMUNICATION COMPATIBILITY

(71) Applicant: Telefonaktiebolaget LM Ericsson (publ), Stockholm (SE)

(72) Inventor: Tomas Nylander, Värmdö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/430,483

(22) PCT Filed: Feb. 12, 2020

(86) PCT No.: PCT/SE2020/050149
§ 371 (c)(1),
(2) Date: Aug. 12, 2021

(87) PCT Pub. No.: WO2020/167225
PCT Pub. Date: Aug. 20, 2020

(65) Prior Publication Data
US 2022/0150333 A1    May 12, 2022

Related U.S. Application Data

(60) Provisional application No. 62/804,843, filed on Feb. 13, 2019.

(51) Int. Cl.
*H04L 69/325* (2022.01)
*H04W 4/38* (2018.01)
(Continued)

(52) U.S. Cl.
CPC .......... *H04L 69/325* (2013.01); *H04L 69/326* (2013.01); *H04W 4/38* (2018.02); *H04W 4/40* (2018.02); *H04W 4/80* (2018.02)

(58) Field of Classification Search
CPC ...... H04L 69/325; H04L 69/326; H04W 4/38; H04W 4/80; H04W 4/40
See application file for complete search history.

(56) References Cited

U.S. PATENT DOCUMENTS 9,479,371 B2 * 10/2016 Li ........................... H04L 47/12
10,231,101 B2 * 3/2019 Gozalvez-Serrano ....................... H04W 4/46

(Continued)

FOREIGN PATENT DOCUMENTS

WO    2018074956 A1    4/2018

OTHER PUBLICATIONS

Author Unknown, "Intelligent Transport Systems (ITS); Communications Architecture," ETSI EN 302 665 V1.1.1, Sep. 2010, European Telecommunications Standards Institute 2010, 44 pages.

(Continued)

*Primary Examiner* — Blake J Rubin
(74) *Attorney, Agent, or Firm* — Withrow & Terranova, PLLC

(57) ABSTRACT

Systems and methods for compatibility in European Telecommunications Standards Institute (ETSI) Cooperative Intelligent Transport System (C-ITS) station communications are disclosed. Embodiments of a method performed by a C-ITS station are disclosed. In some embodiments, the method comprises receiving a message, determining whether the message was received via an external interface of the C-ITS station or a short range interface of the C-ITS station, and upon determining that the message was received via the external interface of the C-ITS station, treating the message differently as compared to if the message was received via the short range interface of the C-ITS station.

13 Claims, 7 Drawing Sheets

(51) Int. Cl.
*H04L 69/326* (2022.01)
*H04W 4/80* (2018.01)
*H04W 4/40* (2018.01)

(56) References Cited

U.S. PATENT DOCUMENTS

| | | | | |
|---|---|---|---|---|
| 10,459,454 | B2* | 10/2019 | Saxena | G05D 1/0295 |
| 10,499,370 | B2* | 12/2019 | Xu | H04W 4/06 |
| 11,212,730 | B2* | 12/2021 | Back | H04W 40/32 |
| 2017/0353777 | A1* | 12/2017 | Mach | G08B 21/12 |
| 2018/0262865 | A1* | 9/2018 | Lepp | H04W 76/28 |
| 2018/0365909 | A1* | 12/2018 | Cheng | H04L 67/12 |
| 2019/0041223 | A1* | 2/2019 | Yang | G01C 21/30 |
| 2019/0045378 | A1* | 2/2019 | Rosales | H04L 67/34 |
| 2019/0052359 | A1* | 2/2019 | Brady | G08G 1/162 |
| 2019/0116582 | A1* | 4/2019 | Pelletier | H04W 72/048 |
| 2019/0132709 | A1* | 5/2019 | Graefe | G08G 1/0133 |
| 2019/0141495 | A1* | 5/2019 | Jha | H04W 40/026 |
| 2019/0182700 | A1* | 6/2019 | Kim | H04W 4/46 |
| 2019/0273624 | A1* | 9/2019 | Hoffmann | H04W 4/24 |
| 2019/0294966 | A1* | 9/2019 | Khan | G06V 10/82 |
| 2019/0296426 | A1* | 9/2019 | Sohn | H01Q 5/50 |
| 2020/0036644 | A1* | 1/2020 | Belogolovy | H04L 1/0014 |
| 2020/0037127 | A1* | 1/2020 | Hwang | B60W 50/00 |
| 2020/0037217 | A1* | 1/2020 | Shapiro | H04W 36/08 |
| 2020/0045552 | A1* | 2/2020 | Kim | H04W 12/069 |
| 2020/0098257 | A1* | 3/2020 | Lykkja | G08G 1/056 |
| 2020/0100167 | A1* | 3/2020 | Cheng | H04W 4/40 |
| 2020/0120505 | A1* | 4/2020 | Kim | H04W 4/44 |
| 2020/0183416 | A1* | 6/2020 | Cheng | H04W 4/38 |
| 2020/0228988 | A1* | 7/2020 | Yang | H04L 63/1466 |
| 2020/0247200 | A1* | 8/2020 | Ferrer | G01S 5/0284 |
| 2020/0336908 | A1* | 10/2020 | Kim | H04W 12/062 |
| 2020/0359455 | A1* | 11/2020 | Hofmann | H04L 69/18 |
| 2020/0396639 | A1* | 12/2020 | Hofmann | H04W 72/02 |
| 2021/0105789 | A1* | 4/2021 | Freda | H04W 72/10 |
| 2021/0144524 | A1* | 5/2021 | Byun | H04W 72/046 |
| 2021/0201664 | A1* | 7/2021 | McQuillen | B60W 30/09 |
| 2022/0086609 | A1* | 3/2022 | Hwang | H04W 4/023 |

OTHER PUBLICATIONS

Author Unknown, "Intelligent Transport Systems (ITS); Framework for Public Mobile Networks in Cooperative ITS (C-ITS)," Draft ETSI TR 102 962 V1.1.4, Jan. 2019, European Telecommunications Standards Institute 2012, 54 pages.

Author Unknown, "Intelligent Transport Systems (ITS); Security; Pre-standardization Study on ITS Facilities Layer Security for C-ITS Communication Using Cellular Uu Interface," ETSI TR 103 630 V0.0.2, Sep. 2018, ETSI, 23 pages.

International Search Report and Written Opinion for International Patent Application No. PCT/SE2020/050149, dated Apr. 14, 2020, 12 pages.

\* cited by examiner

EUROPEAN TELECOMMUNICATIONS STANDARDS INSTITUTE (ETSI) COOPERATIVE INTELLIGENT TRANSPORT SYSTEM (C-ITS) COMMUNICATION COMPATIBILITY

RELATED APPLICATIONS

This application is a 35 U.S.C. § 371 national phase filing of International Application No. PCT/SE2020/050149, filed Feb. 12, 2020, which claims the benefit of U.S. provisional patent application Ser. No. 62/804,843, filed Feb. 13, 2019, the disclosures of which are hereby incorporated herein by reference in their entireties.

TECHNICAL FIELD

The present invention relates generally to the field of communicating vehicle related information for the purpose of increasing traffic safety.

BACKGROUND

There is a lot of effort ongoing to increase traffic safety, one initiative being to equip vehicles and roadside equipment (e.g., road side units) with short range radio and exchange information that could mitigate accidents, optimize traffic flows, etc. This is also known as Intelligent Transport Systems (ITS) and Cooperative Intelligent Transport Systems (C-ITS). These types of solutions are being specified and tested in many places. At the moment, there are two short range Vehicle to Everything (V2X) communication technologies specified and discussed to support the ITS safety services in the spectrum allocated for ITS, e.g., 5875 Megahertz (MHz) to 5905 MHz. The two short range technologies are the Third Generation Partnership Project (3GPP) Cellular-ITS Sidelink (also known as PC5) based on Long Term Evolution (LTE) technology and IEEE 802.11p, also known as Dedicated Short Range Communication (DSRC).

The 3GPP based technology that includes both cellular long range (i.e., the Uu interface) and short range (i.e., sidelink or PC5) is also known as Cellular-V2X (C-V2X) or LTE Vehicle (LTE-V).

These C-ITS messages are specified according to European Telecommunications Standards Institute (ETSI) European Standard (EN) 302 665 and referenced standards. In Europe, C-ITS is referred to as ITS-G5. In the United States (US) and other parts of the world, C-ITS is referred to as DSRC or Wireless Access in Vehicular Environments (WAVE).

At the same time, there are ongoing discussions about how to exchange this information between backend systems, e.g., between a vehicle Original Equipment Manufacturer (OEM) backed system and a road traffic authority in a interoperable way, i.e., using cellular (long range) to/from client/vehicles to application/OEM backends and use internet connectivity between different backends.

There currently exist certain challenges. The ETSI message format is tied to the use of short range technology. That is, there are protocol layers in the ITS station reference architecture that are specific to the use of, e.g., ITS-G5. The protocol layers are illustrated in FIG. 1. Management of the ETSI message employs software including ITS Applications, ITS Facilities (CAM/DENM/IVI etc.), ITS Networking and Transport, and Access.

As can be seen in FIG. 1, the security interaction (Security Entity-Networking and transport layer SAP (SN-SAP)), e.g., the signing of the message, is performed at the ITS networking and transport layer (Basic Transport Protocol (BTP)/GeoNetwork). This means that the networking and transport layer (BTP/GeoNetwork) needs to be included in the message to be standard compliant. The security software includes Security Services and Security Management layers.

The networking and transport layer (BTP/GeoNetwork) is not needed when the message is sent via cellular (long range) mobile networks, since this layer gives information about how to treat and distribute the message in the local area in which it is received, i.e., in the range of the short range radio (e.g., a couple of 100 meters (m)). When using cellular mobile networks, the range is theoretically unlimited, and the information about how to treat and distribute the message locally may not apply. Therefore, other means are required to determine how to distribute the message/information in cellular mobile networks.

There are intense discussions in the industry and among road authorities about how to transport these messages using ordinary cellular mobile networks on the radio interface (i.e., the 3GPP specified Uu interface). One issue is how to populate the information in the networking and transport layer (BTP/GeoNetwork). For example, when a vehicle is to send these ETSI ITS-G5 messages, or PC5 (C-V2X) messages, what should the vehicle send in this layer. Similarly, if a road authority or road operator is to send this information, then it would need to use one setting for distributing via their Roadside Units (RSUs) and another setting if sending the message using the cellular network (Uu).

The current discussion is to write a new standard that describes this, which will take years, or make a so-called "Uu profile" that specifies how to set the information in the networking and transport layer (BTP/GeoNetwork).

If no new standard is made and if no common Uu profile is made, vehicles of different brands will set the networking and transport layer (BTP/GeoNetwork) differently, i.e., the receiver side will have a hard time understanding what to do with this information otherwise, i.e., it will be difficult to achieve interoperability.

Similar problems exist for the DSRC technology when those messages are sent via the cellular network (Uu).

Summary

Systems and methods for compatibility in European Telecommunications Standards Institute (ETSI) Cooperative Intelligent Transport System (C-ITS) station communications are disclosed. Embodiments of a method performed by a C-ITS station are disclosed. In some embodiments, the method comprises receiving a message, determining whether the message was received via an external interface of the C-ITS station or a short range interface of the C-ITS station, and upon determining that the message was received via the external interface of the C-ITS station, treating the message differently as compared to if the message was received via the short range interface of the C-ITS station.

In some embodiments, the message comprises networking and transport layer information, and treating the message differently comprises treating the networking and transport layer information differently as compared to if the message was received via the short range interface of the C-ITS station. In some embodiments, treating the networking and transport layer information differently as compared to if the message was received via the short range interface of the C-ITS station comprises ignoring the networking and transport layer information.

In some embodiments of the method, the message is an ETSI C-ITS message. In some embodiments, the C-ITS station is a personal C-ITS station, a central C-ITS station, a vehicular C-ITS station, or a roadside C-ITS station.

Embodiments of a system that implements a C-ITS station is disclosed. In some embodiments, the system is adapted to, in order to implement the C-ITS station receive a message, determine whether the message was received via an external interface of the C-ITS station or a short range interface of the C-ITS station, and upon determining that the message was received via the external interface of the C-ITS station, treat the message differently as compared to if the message was received via the short range interface of the C-ITS station.

In some embodiments, the message comprises networking and transport layer information and, in order to treat the message differently, the system is adapted to treat the networking and transport layer information differently as compared to if the message was received via the short range interface of the C-ITS station. In some embodiments, in order to treat the networking and transport layer information differently as compared to if the message was received via the short range interface of the C-ITS station, the system is adapted to ignore the networking and transport layer information.

In some embodiments of the system, the message is an ETSI C-ITS message. In some embodiments of the system, the C-ITS station is a personal C-ITS station, a central C-ITS station, a vehicular C-ITS station, or a roadside C-ITS station.

In some embodiments, the system comprises an external interface, a short range interface, and processing circuitry associated with the external interface and the short range interface, the processing circuitry being adapted to, in order for the system to implement the C-ITS station, cause the system to receive a message, determine whether the message was received via an external interface of the C-ITS station or a short range interface of the C-ITS station, and upon determining that the message was received via the external interface of the C-ITS station, treat the message differently as compared to if the message was received via the short range interface of the C-ITS station.

In some embodiments of the system, the message comprises networking and transport layer information and, in order to treat the message differently, the processing circuitry is adapted to cause the system to treat the networking and transport layer information differently as compared to if the message was received via the short range interface of the C-ITS station. In some embodiments of the system, in order to treat the networking and transport layer information differently as compared to if the message was received via the short range interface of the C-ITS station, the processing circuitry is adapted to cause the system to ignore the networking and transport layer information. In some embodiments of the system, the message is an ETSI C-ITS message. In some embodiments, the C-ITS station is a personal C-ITS station, a central C-ITS station, a vehicular C-ITS station, or a roadside C-ITS station.

Herein, the terms Intelligent Transport Systems (ITS) and Cooperative Intelligent Transport Systems (C-ITS) may be used interchangeably.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
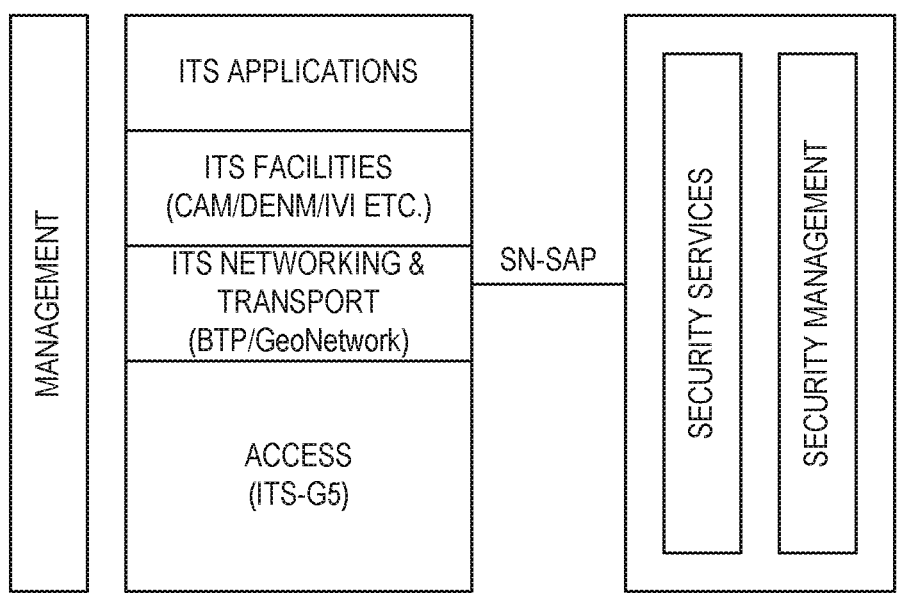
FIG. 1 is a diagram illustrating organization of protocol layers in the Intelligent Transport System (ITS) station reference architecture.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Certain aspects of the present disclosure and their embodiments may provide solutions to the aforementioned or other challenges.

As noted above, the terms Intelligent Transport Systems (ITS) and Cooperative Intelligent Transport Systems (C-ITS) may be used interchangeably herein.

In the European Telecommunications Standards Institute (ETSI) specifications, there is the notion of "Cooperative Intelligent Transport System (C-ITS) stations" being a fundamental part of C-ITS. It is the C-ITS stations that exchange C-ITS information between them. There can be Vehicular C-ITS Stations (V-ITS-Ss), Roadside C-ITS Stations (R-ITS-Ss), and Central C-ITS Stations (C-ITS-Ss). The C-ITS-Ss can be located in the backend system, e.g., in the cloud.

Embodiments of the present disclosure provide a C-ITS station, and method of operation thereof, in which the C-ITS station treats the networking and transport layer (BTP/GeoNetwork) of a received message differently when the message is received via a cellular interface (e.g., the Uu interface such as, e.g., the LTE Uu interface) or on a backend interface as compared to when a message is received via a short range interface (e.g., an ITS-G5 interface). Aspects and embodiments disclosed herein with reference to an ITS-G5 interface, as an example, are also applicable to other short range interfaces, such as PC5 (V2X, LTE-V). In these examples, the receiving C-ITS station can ignore the networking and transport layer (BTP/GeoNetwork) or use part of it, e.g., for its analysis on what to do with the received message when the received message is received on the cellular (Uu) interface or on a backend interface (e.g., an interface towards the Internet or for a message received from other backend systems).

When an ETSI message is received by a C-ITS station on a cellular (long range) interface, or on a backend interface (e.g., an interface used towards other backend actors), the C-ITS station treats the information in the networking and transport layer (BTP/GeoNetwork) differently compared to when received on a short range interface, in the case of either an ITS-G5 (DSRC) or PC5 (C-V2X, LTE-V) interface. For example, the C-ITS station can drop or ignore the information conveyed in the networking and transport layer (BTP/GeoNetwork) when the message is received on the cellular or backend interface since this information relates to short range.

There are, disclosed herein, various embodiments which address one or more of the issues disclosed herein.

Certain embodiments may provide one or more of the following technical advantages. The proposed solution provides an easy to describe/understand implementation that does not require any new standards, or a "Uu profile."

Figure 2:
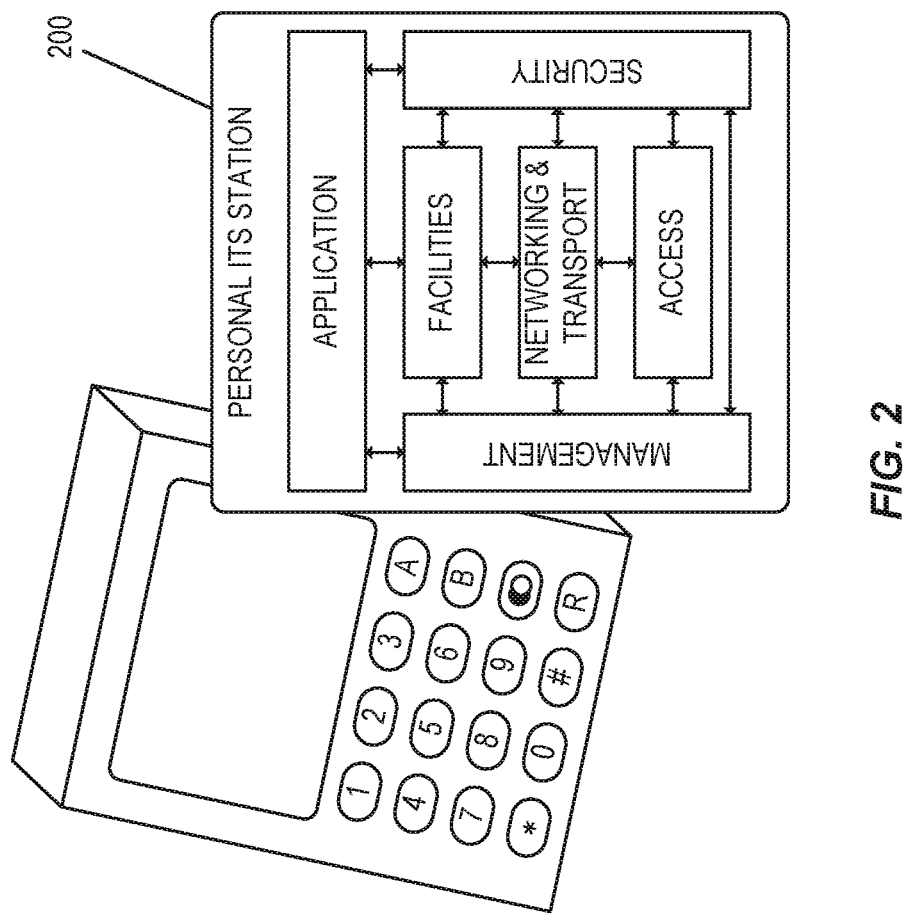
FIG. 2 is an illustration of one example of a personal ITS station and a diagram of European Telecommunications Standards Institute (ETSI) Personal ITS station and protocol layers employed therein.

FIG. 2 is an illustration of a Personal ITS station as depicted in the ETSI EN 302 665 specification shown in relation to embodiments of the present disclosure. Again, while the example embodiments are described herein with respect to C-ITS stations of ETSI EN 302 665, the present disclosure is not limited thereto.

Notably, as used herein, a C-ITS station is a functional entity of the C-ITS architecture. A C-ITS station may be implemented in one or more physical components including hardware (e.g., processing circuitry such as, e.g., one or more Central Processing Units (CPUs), one or more Application Specific Integrated Circuits (ASICs), one or more Field Programmable Gate Arrays (FPGAs), and/or the like, or any combination thereof) and possibly software (e.g., software instructions stored in memory and executed by processing circuitry). Alternatively, the C-ITS station may be implemented as software (e.g., a software application) that can be executed on appropriate hardware (e.g., a vehicular C-ITS station may be implemented as a software application that is executed on hardware within a vehicle).

Embodiments of the present disclosure provide a C-ITS station, and method of operation thereof, in which the C-ITS station treats the networking and transport layer (BTP/GeoNetwork) of a received message differently when the message is received via a cellular interface (e.g., the Uu interface such as, e.g., the LTE Uu interface) or on a backend interface as compared to when a message is received via a short range interface (e.g., an ITS-G5 interface). For example, the receiving C-ITS station can ignore the networking and transport layer (BTP/GeoNetwork) layer, or use part of it, e.g., for its analysis on what to do with the received message when the received message is received on the cellular (Uu) interface or on a backend interface (e.g., an interface towards the Internet or for a message received from other backend systems).

When an ETSI message is received by a C-ITS station on a cellular (long range) interface, or on a backend interface (e.g., an interface used towards other backend actors), the C-ITS station treats the information in the networking and transport layer (BTP/GeoNetwork) layer differently compared to when received on a short range interface (e.g., ITS-G5, DSRC). For example, the C-ITS station can drop or ignore the information conveyed in the networking and transport layer (BTP/GeoNetwork) when the message is received on the cellular or backend interface since this information relates to short range.

Personal C-ITS Station

FIG. 2 illustrates a personal ITS station 200 ("C-ITS station 200") in accordance with some embodiments of the present disclosure.

There are discussions if a personal device, e.g., a smartphone, can be a C-ITS station and include the ETSI protocol stack and short range radio, e.g., for ITS-G5.

In such a case, the C-ITS station 200 would have two interfaces, a cellular interface (e.g., the Uu interface such as the LTE Uu interface) and a short range interface (e.g., an ITS-G5 interface or a DSRC interface). Then, according to one embodiment of the present disclosure, when the C-ITS station 200 receives a message (e.g., an ETSI C-ITS message) on the cellular interface, the C-ITS station 200 treats information contained in the received message for the networking and transport layer (BTP/GeoNetwork) differently than if the message would have been received on the short range interface. For example, in one example embodiment, when the C-ITS station 200 receives a message (e.g., an ETSI C-ITS message) on the cellular interface, the C-ITS station 200 ignores the information contained in the received message for the networking and transport layer (BTP/GeoNetwork). In some embodiments, the treatment of the information contained in the received message for the networking and transport layer (BTP/GeoNetwork) is handled on an application level where the different interfaces are tied together.

When sending an ETSI C-ITS message on the cellular interface, the networking and transport layer (BTP/GeoNetwork) information can be the same as when the message is sent on short range radio, e.g., ITS-G5.

Central C-ITS Station

Figure 3:
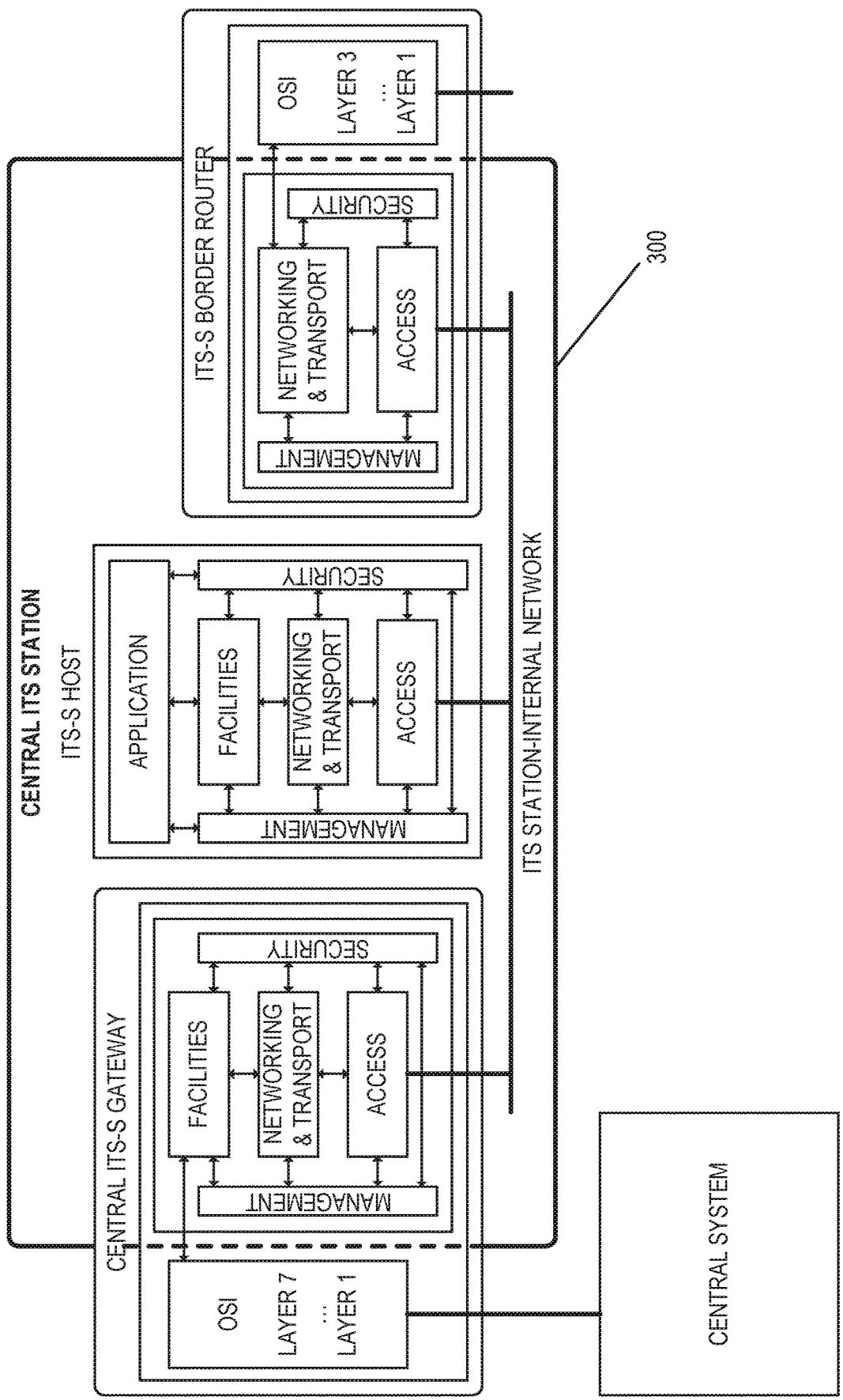
FIG. 3 is a diagram illustrating a central ITS station in a central sub-system including short range and long range communication interfaces.

FIG. 3 illustrates a central ITS station 300 ("C-ITS station 300") in accordance with some embodiments of the present disclosure.

For the central C-ITS station 300, there are at least two different interfaces, one interface towards the short range (e.g., ITS-G5) domain and another interface towards the external world via so-called ITS Station (ITS-S) interceptors (ETSI terminology) such as, e.g., a central C-ITS-S gateway or an ITS-S border router.

According to one embodiment of the present disclosure, when the central C-ITS station 300 receives a message (e.g., an ETSI C-ITS message) on the interface towards the external world, the central C-ITS station 300 treats the networking and transport layer (BTP/GeoNetwork) information in the received message differently as compared to if the message was received via the short range interface. For example, in one example embodiment, when the central C-ITS station 300 receives a message (e.g., an ETSI C-ITS message) on the interface towards the external world, the central C-ITS station 300 ignores the networking and transport layer (BTP/GeoNetwork) information. The treatment of the networking and transport layer (BTP/GeoNetwork) information can be handled by an ITS-S host, or by a C-ITS interceptor. If handled by the ITS-S host, the origin of the C-ITS message is potentially indicated by additional information added by the C-ITS interceptor in the protocol between the entities.

When sending the ETSI C-ITS message towards the external world, the networking and transport layer (BTP/GeoNetwork) information can be the same as when the message is sent to the short range domain for further distribution on short range radio, e.g., ITS-G5.

Vehicular or Vehicle C-ITS Station

Figure 4:
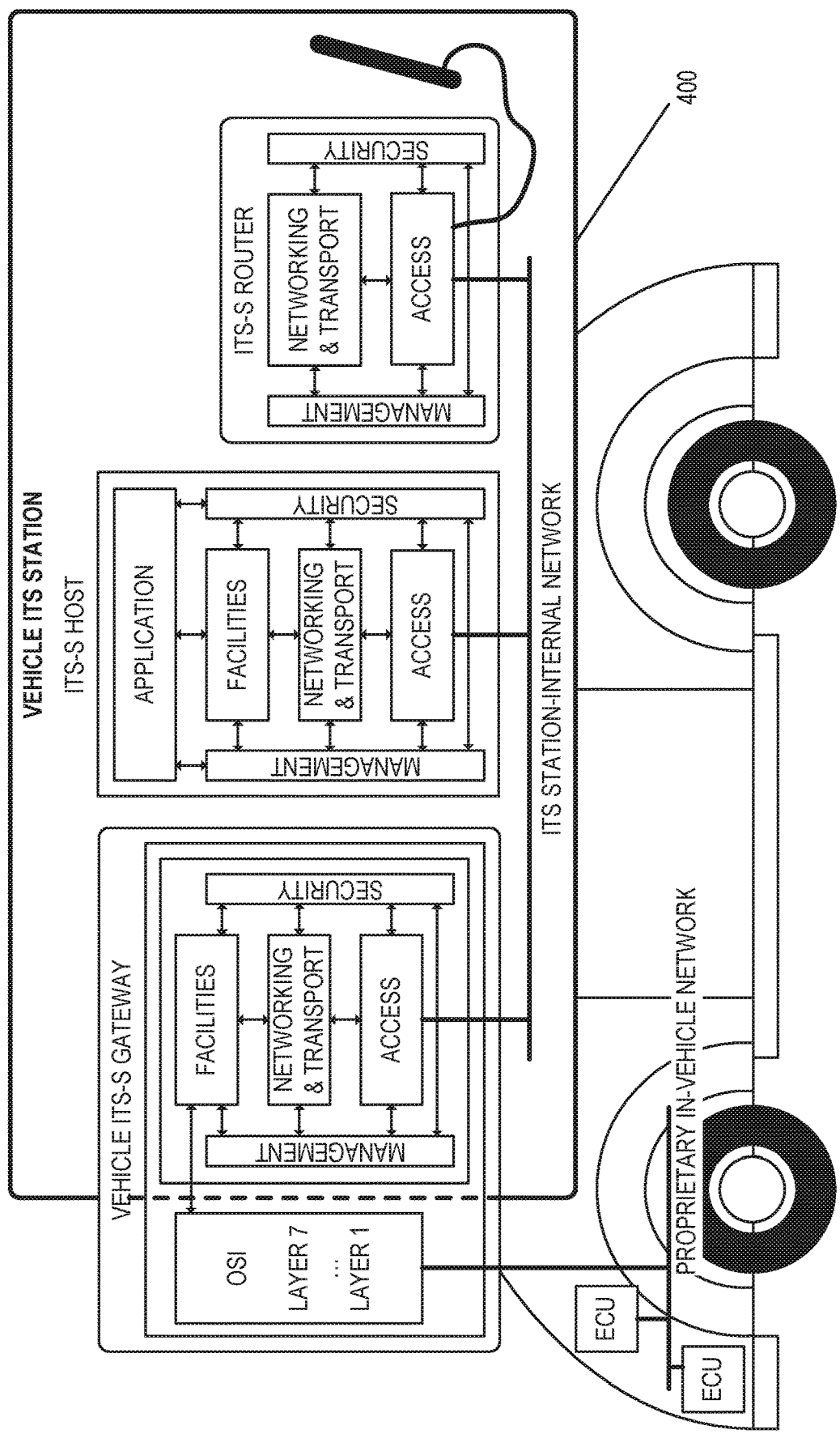
FIG. 4 is a diagram illustrating a vehicular ITS station in a vehicle sub-system including short range and long range communication interfaces.

FIG. 4 illustrates a vehicular or vehicle ITS station 400 ("C-ITS station 400") in accordance with some embodiments of the present disclosure.

The vehicular C-ITS station 400 has an external cellular interface (Uu) as well as a short range interface. In some embodiments, when the vehicle C-ITS station 400 receives a message (e.g., an ETSI C-ITS message), the ITS-S interceptors (e.g., the vehicle C-ITS-S gateway) or the ITS-S host, in a similar way as described for the central C-ITS station 300 in FIG. 3, treats the networking and transport layer (BTP/GeoNetwork) information in the received message differently as compared to if the message was received via the short range interface. For example, in one example embodiment, when the vehicular C-ITS station 400 receives a message (e.g., an ETSI C-ITS message) on the external interface, the vehicular C-ITS station 400 (e.g., the vehicle C-ITS-S gateway or the ITS-S host) ignores the networking and transport layer (BTP/GeoNetwork) information in the received message. If handled by the ITS-S host, potentially the origin of the C-ITS message is indicated by additional information added by the C-ITS interceptor in the protocol between the entities.

Roadside C-ITS Station

Figure 5:
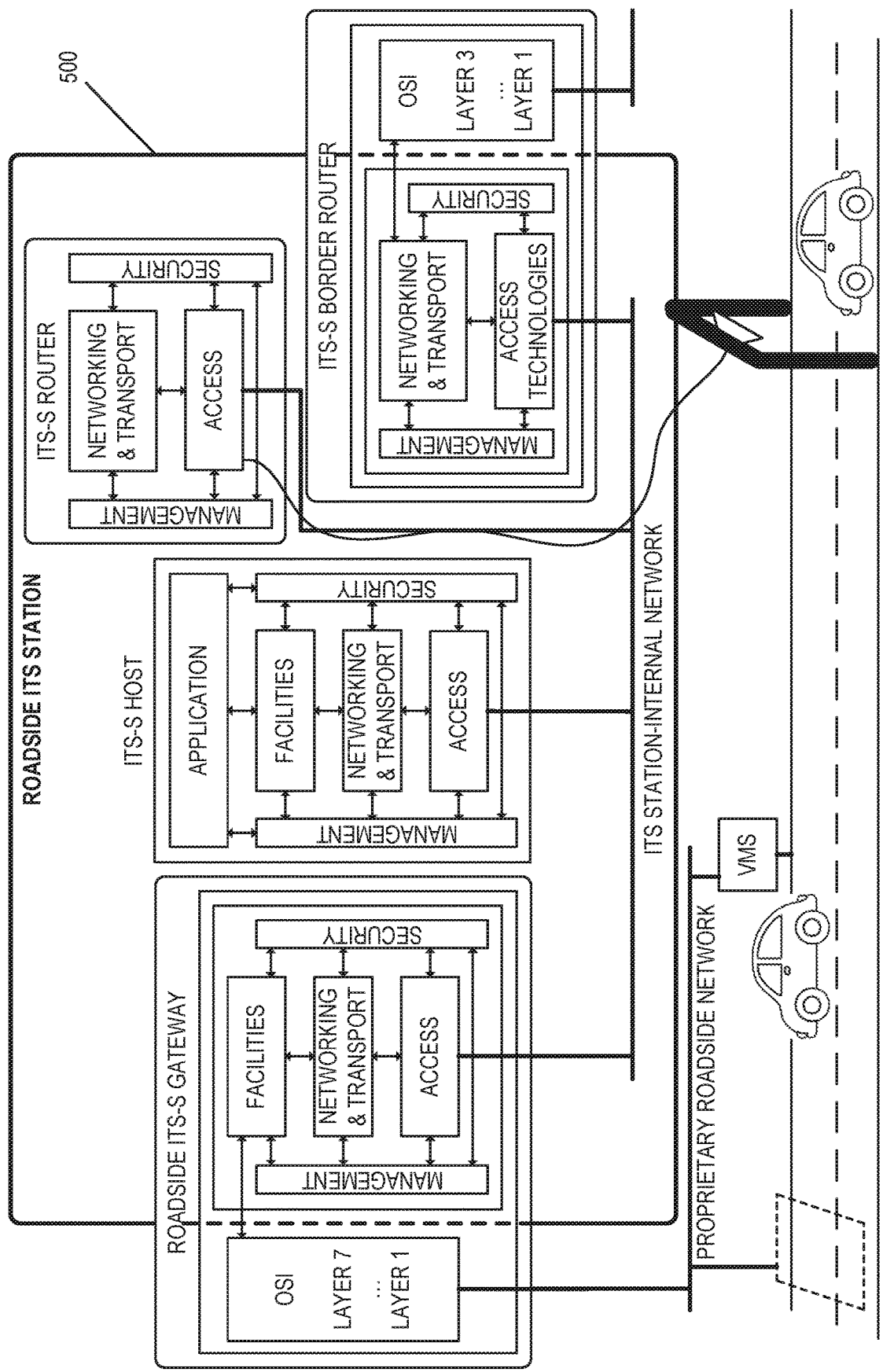
FIG. 5 is a diagram illustrating a roadside ITS station in a roadside sub-system including short range and long range communication interfaces.

FIG. 5 illustrates a roadside ITS station 500 ("C-ITS station 500") in accordance with some embodiments of the present disclosure.

For the roadside C-ITS station 500, there are at least two different interfaces, one interface towards the short range (e.g., ITS-G5) domain and another interface towards the external world via so-called ITS-S interceptors (e.g., the roadside C-ITS-S gateway) or the ITS-S border router.

According to the one embodiment of the present disclosure, when the roadside C-ITS station 500 receives a message (e.g., an ETSI C-ITS message) on the interface towards the external world and the ETSI C-ITS message is not created by the central C-ITS station that is part of the roadside system (i.e., not created by the central C-ITS station that controls the roadside C-ITS station 500), the roadside C-ITS station 500 treats the networking and transport layer (BTP/GeoNetwork) information in the received message differently as compared to if the message was received via the short range interface. For example, in one example embodiment, when the roadside C-ITS station 500 receives a message (e.g., an ETSI C-ITS message) on the external interface where the creator of the message is not the related central C-ITS station, the roadside C-ITS station 500 ignores the networking and transport layer (BTP/GeoNetwork) information in the received message. This can be handled by the ITS-S host, or by the C-ITS interceptor. If handled by the ITS-S host, potentially the origin of the C-ITS message is indicated by additional information added by the C-ITS interceptor in the protocol between the entities.

When sending the ETSI C-ITS message towards the external world, the networking and transport layer (BTP/GeoNetwork) information can be the same as when the message is sent to the short range domain for further distribution on short range radio, e.g., ITS-G5.

Figure 6:
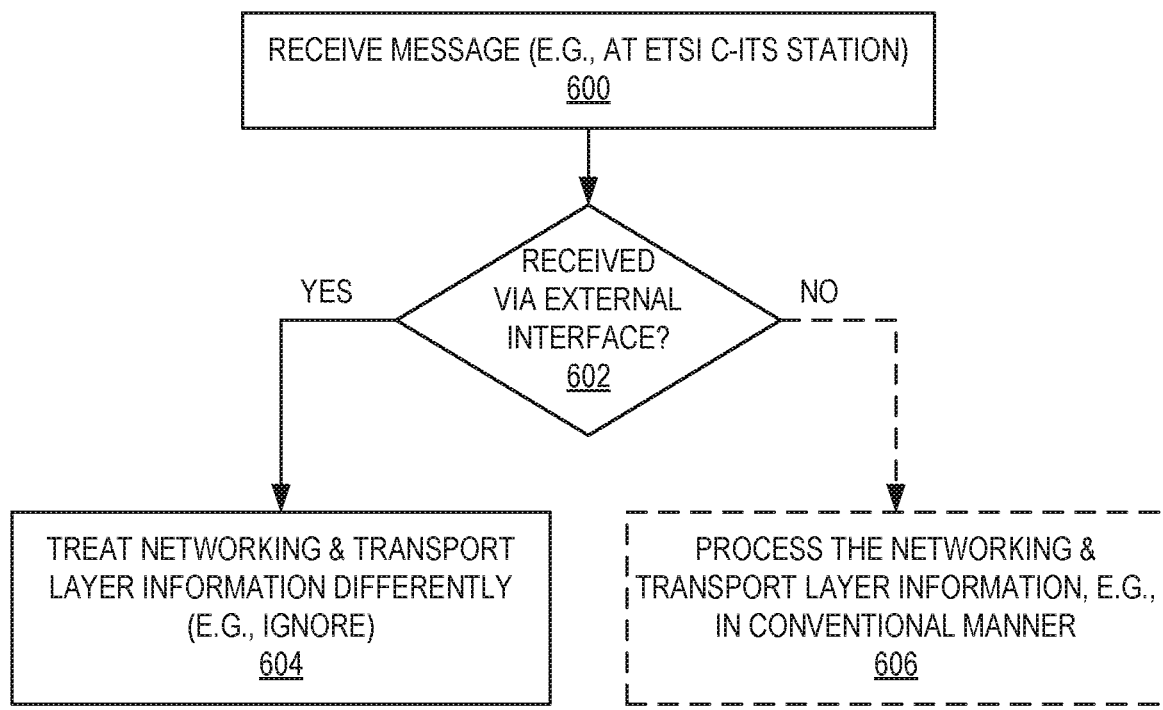
FIG. 6 is a flowchart illustrating operation of an ITS station receiving a message.

FIG. 6 is a flowchart that illustrates the operation of a C-ITS station in accordance with at least some aspects of the embodiments described above. As illustrated, the C-ITS station receives a message (e.g., an ETSI C-ITS message) (step 600). The C-ITS station determines whether the message was received via an external interface (e.g., as opposed to a short range interface) (step 602). If the message was received via the external interface, the C-ITS station treats the networking and transport layer (BTP/GeoNetwork) information included in the received message differently as compared to if the message was received via the short range interface (step 604). For example, the C-ITS station ignores the networking and transport layer (BTP/GeoNetwork) information included in the received message. Optionally, if the message was received via the short range interface, the C-ITS station processes the networking and transport layer (BTP/GeoNetwork) information (e.g., in the conventional manner) (step 606).

Figure 7:
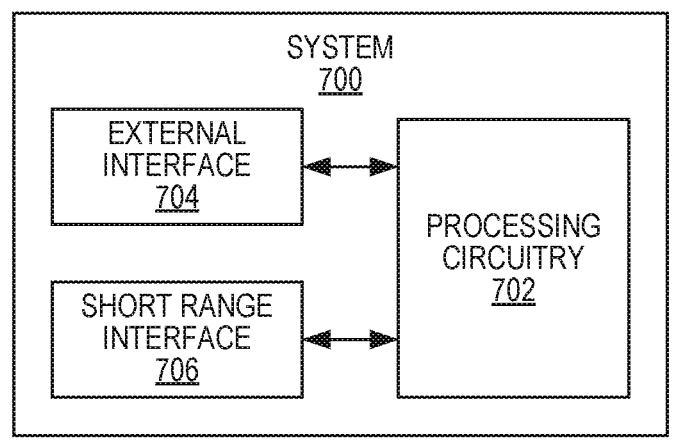
FIG. 7 is a schematic block diagram of an ITS station in a system including processing circuitry and interfaces.

FIG. 7 is a schematic block diagram of one example of a system 700 in which a C-ITS station is implemented in accordance with some embodiments of the present disclosure. As illustrated, the system 700 includes processing circuitry 702, an external interface 704, and a short range interface 706. The processing circuitry 702 includes one or more processors (e.g., CPUs, ASICs, FPGAs, and/or the like) and, in some embodiments, memory storing software executable by the one or more processors. The processing circuitry 702 operates to provide the functionality of the C-ITS station in accordance with any of the embodiments described herein (e.g., the functionality of a C-ITS station as described above with respect to, e.g., FIG. 6). As an example, the functionality of the C-ITS station described herein may be implemented in software that is, e.g., stored in memory and executed by one or more processors within the processing circuitry 702. The external interface 704 includes hardware and, in some embodiments, software operating to provide the functionality of an external interface as described herein. The short range interface 706 includes hardware and, in some embodiments, software operating to provide the functionality of a short range interface as described herein. Note that, in some embodiments, the system 700 is the C-ITS station (i.e., the C-ITS station includes the hardware shown in FIG. 7 and any software that causes the C-ITS station to perform the functions of the C-ITS station). In some other embodiments, the C-ITS station is software (e.g., a software application), and the system 700 is a separate hardware on which the C-ITS station can be installed and executed to cause the system 700 to perform the functions of the C-ITS station.

In some embodiments, a computer program including instructions which, when executed by at least one processor, causes the at least one processor to carry out the functionality of the C-ITS station according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
BSC Base Station Controller
BTP Basic Transport Protocol
BTS Base Transceiver Station
C-ITS Cooperative Intelligent Transport System
CD Compact Disk
COTS Commercial Off-the-Shelf
CPE Customer Premise Equipment
CPU Central Processing Unit
D2D Device-to-Device
DAS Distributed Antenna System
DSP Digital Signal Processor
DSRC Dedicated Short Range Communication
DVD Digital Video Disk
eNB Enhanced or Evolved Node B
E-SMLC Evolved Serving Mobile Location Center
ETSI European Telecommunications Standards Institute
FPGA Field Programmable Gate Array
GHz Gigahertz
gNB New Radio Base Station
gNB-CU New Radio Base Station Central Unit
gNB-DU New Radio Base Station Distributed Unit
GSM Global System for Mobile Communications
IoT Internet of Things
IP Internet Protocol
LEE Laptop Embedded Equipment
LME Laptop Mounted Equipment
LTE Long Term Evolution
M2M Machine-to-Machine
MANO Management and Orchestration
MCE Multi-Cell/Multicast Coordination Entity
MDT Minimization of Drive Tests
MIMO Multiple Input Multiple Output
MME Mobility Management Entity
MSC Mobile Switching Center
MSR Multi-Standard Radio
MTC Machine Type Communication
NB-IoT Narrowband Internet of Things
NFV Network Function Virtualization
NIC Network Interface Controller
NR New Radio
NRF Network Function Repository Function
O&M Operation and Maintenance
OEM Original Equipment Manufacturer
OSS Operations Support System
OTT Over-the-Top
PC Personal Computer
PDA Personal Digital Assistant
P-GW Packet Data Network Gateway
RAM Random Access Memory
RAN Radio Access Network
RAT Radio Access Technology
RF Radio Frequency
RNC Radio Network Controller
ROM Read Only Memory
RRH Remote Radio Head
RRU Remote Radio Unit
RSU Roadside Unit
SCEF Service Capability Exposure Function
SN-SAP Security Entity-Networking and transport layer SAP
SOC System on a Chip
SON Self-Organizing Network
UE User Equipment
USB Universal Serial Bus
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WAVE Wireless Access in Vehicular Environments
WCDMA Wideband Code Division Multiple Access
WiMax Worldwide Interoperability for Microwave Access Those skilled in the art will recognize improvements and modifications to the embodiments of the present disclosure. All such improvements and modifications are considered within the scope of the concepts disclosed herein.

What is claimed is:

1. A method performed by a Cooperative Intelligent Transport System, C-ITS, station the method comprising receiving a message, determining whether the message was received via an external interface of the C-ITS station or a short range interface of the C-ITS station, and upon determining that the message was received via the external interface of the C-ITS station, treating the message differently as compared to if the message was received via the short range interface of the C-ITS station;
    wherein the message comprises networking and transport layer information, and treating the message differently comprises treating the network and transport layer information different as compared to if the message was received via the short range interface of the C-ITS station.

2. The method of claim 1, wherein treating the networking and transport layer information differently as compared to if the message was received via the short range interface of the C-ITS station comprises ignoring the networking and transport layer information.

3. The method of claim 1, wherein the message is a European Telecommunications Standards Institute, ETSI, C-ITS message.

4. The method of claim 1, wherein the C-ITS station is a personal C-ITS station, a central C-ITS station, a vehicular C-ITS station, or a roadside C-ITS station.

5. A system that implements a Cooperative Intelligent Transport System, C-ITS, station, the system being adapted to, in order to implement the C-ITS station, receive a message, determine whether the message was received via an external interface of the C-ITS station or a short range interface of the C-ITS station, and upon determining that the message was received via the external interface of the C-ITS station, treat the message differently as compared to if the message was received via the short range interface of the C-ITS station.

6. The system of claim 5, wherein the message comprises networking and transport layer information and, in order to treat the message differently, the system is adapted to treat the networking and transport layer information differently as compared to if the message was received via the short range interface of the C-ITS station.

7. The system of claim 6, wherein, in order to treat the networking and transport layer information differently as compared to if the message was received via the short range interface of the C-ITS station, the system is adapted to ignore the networking and transport layer information.

8. The system of claim 5, wherein the message is a European Telecommunications Standards Institute, ETSI, C-ITS message.

9. The system of claim 5, wherein the C-ITS station is a personal C-ITS station, a central C-ITS station, a vehicular C-ITS station, or a roadside C-ITS station.

10. A system that implements a Cooperative Intelligent Transport System, C-ITS, station, the system comprising an external interface, a short range interface, and processing circuitry associated with the external interface and the short range interface, the processing circuitry being adapted to, in order for the system to implement the C-ITS station, cause the system to receive a message, determine whether the message was received via an external interface of the C-ITS station or a short range interface of the C-ITS station, and upon determining that the message was received via the external interface of the C-ITS station, treat the message differently as compared to if the message was received via the short range interface of the C-ITS station;

wherein the message comprises networking and transport layer information and, in order to treat the message differently, the processing circuitry is adapted to cause the system to treat the networking and transport layer information differently as compared to if the message was received via the short range interface of the C-ITS station.

11. The system of claim 10, wherein, in order to treat the networking and transport layer information differently as compared to if the message was received via the short range interface of the C-ITS station, the processing circuitry is adapted to cause the system to ignore the networking and transport layer information.

12. The system of claim 10, wherein the message is a European Telecommunications Standards Institute, ETSI, C-ITS message.

13. The system of claim 10, wherein the C-ITS station is a personal C-ITS station, a central C-ITS station, a vehicular C-ITS station, or a roadside C-ITS station.

* * * * *